United States Patent
Elterman (10) Patent No.: US 11,649,853 B2
(45) Date of Patent: May 16, 2023

(54) FIBER REINFORCED BEARING FOR A BALL SOCKET ASSEMBLY, BALL SOCKET ASSEMBLY THEREWITH AND METHODS OF CONSTRUCTION THEREOF

(71) Applicant: FEDERAL-MOGUL MOTORPARTS LLC, Southfield, MI (US)

(72) Inventor: James Elterman, Byrnes Mill, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 385 days.

(21) Appl. No.: 16/513,535

(22) Filed: Jul. 16, 2019

(65) Prior Publication Data

US 2020/0025240 A1    Jan. 23, 2020

Related U.S. Application Data

(60) Provisional application No. 62/699,122, filed on Jul. 17, 2018.

(51) Int. Cl.
*F16C 11/06* (2006.01)
*F16C 11/08* (2006.01)

(52) U.S. Cl.
CPC ...... *F16C 11/0633* (2013.01); *F16C 11/0638* (2013.01); *F16C 11/086* (2013.01);
(Continued)

(58) Field of Classification Search
CPC . F16C 11/0633; F16C 11/0638; F16C 11/086; Y10T 403/32713;
(Continued)

(56) References Cited

U.S. PATENT DOCUMENTS 2,292,675 A * 8/1942 Thiry ............... F16C 11/0633
464/72
3,779,619 A * 12/1973 Van Dorn ............ F16C 33/00
384/206
(Continued)

FOREIGN PATENT DOCUMENTS

CN          201902438 U       7/2011
DE          3619004 C1 * 12/1987   .......... F16C 11/0638
(Continued)

OTHER PUBLICATIONS

International Search Report, dated Oct. 22, 2019 (PCT/US2019/042104).

*Primary Examiner* — Matthew R McMahon
(74) *Attorney, Agent, or Firm* — Robert L. Stearns; Dickinson Wright, PLLC (57) ABSTRACT

A ball socket assembly, bearing therefor, and method of construction thereof are provided. The ball socket assembly includes a housing with an inner bore extending between a closed first end region and an open second end region. A fiber-reinforced bearing is disposed in the inner bore. The bearing has a lower portion presenting a lower bearing surface having a first radius of curvature and an upper portion presenting an upper bearing surface having a second radius of curvature that is greater than the first radius of curvature. The lower bearing surface and the upper bearing surface surround a ball cavity in which a spherical ball portion of a ball stud is disposed. The housing second end region is plastically deformed radially inwardly to impart a bias on the bearing upper portion that causes the second radius of curvature to be biased substantially equal to the first radius of curvature.

14 Claims, 7 Drawing Sheets

(52) U.S. Cl.
CPC .............. *Y10T 403/32713* (2015.01); *Y10T 403/32721* (2015.01); *Y10T 403/32762* (2015.01)

(58) Field of Classification Search
CPC ..... Y10T 403/32721; Y10T 403/32762; Y10T 403/32778
See application file for complete search history.

(56) References Cited

U.S. PATENT DOCUMENTS

| | | | | |
|---|---|---|---|---|
| 3,787,127 | A * | 1/1974 | Cutler | F16C 11/0638 403/140 |
| 3,967,907 | A * | 7/1976 | Schmidt | F16C 11/0638 403/140 |
| 4,297,047 | A * | 10/1981 | Farrant | F16C 11/06 403/138 |
| 4,722,631 | A * | 2/1988 | Tagami | F16C 11/0685 403/140 |
| 4,995,755 | A * | 2/1991 | Hyodo | F16C 11/086 403/280 |
| 5,116,159 | A * | 5/1992 | Kern, Jr. | F16C 11/0642 29/898.047 |
| 5,149,067 | A * | 9/1992 | Fruhauf | F16F 13/08 180/312 |
| 5,188,477 | A * | 2/1993 | Idosako | F16C 11/0638 403/138 |
| 5,368,408 | A | 11/1994 | Shimizu et al. | |
| 5,630,672 | A * | 5/1997 | Mc Hale | F16C 11/0638 403/133 |
| 5,655,848 | A | 8/1997 | Catron | |
| 5,795,092 | A * | 8/1998 | Jaworski | B60G 7/003 403/133 |
| 6,152,640 | A * | 11/2000 | Oda | F16C 11/0638 403/133 |
| 6,302,615 | B1 * | 10/2001 | Kleiner | F16C 11/0642 403/135 |
| 6,902,344 | B2 * | 6/2005 | Raak | F16C 11/0638 403/135 |
| 7,182,518 | B2 * | 2/2007 | Lee | F16C 33/201 384/206 |
| 7,320,548 | B2 * | 1/2008 | Budde | F16C 11/0614 384/206 |
| 7,322,769 | B2 * | 1/2008 | Heuser | F16C 11/0638 403/133 |
| 7,452,155 | B2 * | 11/2008 | Brunneke | F16C 17/246 403/135 |
| 7,537,407 | B2 * | 5/2009 | Shima | F16C 11/0638 403/135 |
| 7,641,413 | B2 * | 1/2010 | Shimazu | F16C 11/069 403/135 |
| 8,550,741 | B2 * | 10/2013 | Kuroda | F16C 11/0638 403/143 |
| 9,316,250 | B2 * | 4/2016 | Elterman | F16C 11/0604 |
| 10,711,830 | B2 * | 7/2020 | Englebright | F16C 11/08 |
| 2005/0105961 | A1 * | 5/2005 | Kondoh | F16C 11/0671 403/122 |
| 2007/0212164 | A1 * | 9/2007 | Bosse | F16C 11/0638 403/132 |
| 2009/0288297 | A1 * | 11/2009 | Schmidt | F16C 11/0633 403/135 |
| 2014/0086667 | A1 | 3/2014 | Elterman et al. | |
| 2019/0128319 | A1 * | 5/2019 | Paerewyck | F16C 11/0685 |
| 2019/0285114 | A1 * | 9/2019 | Richter | F16C 11/0638 |

FOREIGN PATENT DOCUMENTS

| | | |
|---|---|---|
| DE | 4305994 A1 | 9/1993 |
| DE | 10 2004 048 753 | 4/2006 |
| EP | 2901032 A1 | 8/2015 |
| FR | 2970052 A1 | 7/2012 |
| JP | 2000120653 A | 4/2000 |
| WO | 2006120787 A1 | 11/2006 |
| WO | 2017210375 A1 | 12/2017 |

* cited by examiner

FIBER REINFORCED BEARING FOR A BALL SOCKET ASSEMBLY, BALL SOCKET ASSEMBLY THEREWITH AND METHODS OF CONSTRUCTION THEREOF

CROSS-REFERENCE TO RELATED APPLICATION

This application claims the benefit of U.S. Provisional Application Ser. No. 62/699,122, filed Jul. 17, 2018, which is incorporated herein by reference in its entirety.

BACKGROUND OF THE INVENTION

1. Field of the Invention

The present invention is related generally to ball socket assemblies, such as for use in a vehicle steering and/or suspension assembly, and more particularly to fiber-reinforced bearings therefor.

2. Related Art

Ball socket assemblies, also referred to as ball joints, are commonly employed in vehicle suspension and steering assemblies to allow two components (such as a control arm and a knuckle, for example) to articulate, pivot and/or rotate relative to one another during operation of the vehicle. Such ball socket assemblies typically include a housing that is fixedly attached with one of the components and a ball stud that is fixedly attached with the other component. The ball stud typically has a ball portion that is received in an inner bore of the housing and a shank portion which projects out of the housing. At least one bearing is disposed in the housing and slidably supports the ball portion of the ball stud to allow the ball stud to rotate and articulate relative to the housing.

In one type of ball joint, the entirety of the bearing within the housing is made as a single, monolithic piece of a material which having a constant radius ball cavity as constructed and assembled that is shaped to receive the ball portion of the ball stud in a snap-fit therein. The snap-fit is provided as a result of the constant radius ball cavity extending about a portion of the ball portion that is greater than a hemisphere. As such, the single bearing provides support to the ball portion along opposite axial directions against opposite hemispheres of the ball portion. In some such ball joints, the bearing is made of a fiber-reinforced material to increase the wear resistance and operating life of the ball joint. Although the fibers within the fiber-reinforced material enhance the operating properties of the bearing, the fibers also increase the stiffness of the bearing material, thereby making it difficult to flex the bearing material sufficiently to snap the ball portion of the ball stud into the constant radius ball cavity without cracking or initiating a crack within the bearing. To avoid cracking only a small percentage of fiber-reinforcement, such as about 5% by volume or less, can be tolerated.

In other such ball joints, the bearing is made of a more flexible unreinforced material such that it can more easily flex without breaking, wherein the bearing is initially constructed having a cylindrical portion which leads to a hemispherical ball cavity. The ball portion is inserted through the cylindrical portion into the hemispherical ball cavity without any "snapping over" process. Then, once the ball portion is seated in the ball cavity, the housing is crimped to both capture the bearing and ball portion in the housing and also to deform the cylindrical portion of the bearing to conform with the ball portion such that the bearing slidably supports opposite hemispheres of the ball portion. Although the problem discussed above for the fiber-reinforced bearing is avoided, the bearing made of unreinforced material suffers by not providing as wear resistant material, and thus, the useful life is reduced.

Accordingly, although the above ball joint assemblies can prove effective in use, solutions to at least the aforementioned problems are sought in order to provide a bearing that is both able to exhibit a long a useful life, as well as exhibit a propensity to avoid being inadvertently damaged, such as during assembly.

SUMMARY OF THE DISCLOSURE

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

It is an object of the present disclosure to provide a ball socket assembly that overcomes disadvantages of known ball socket assemblies.

It is a further object of the present disclosure to provide a method of constructing a ball socket assembly that overcomes disadvantages of known methods of constructing ball socket assemblies.

It is a further object of the present disclosure to provide a ball socket assembly that is economical in manufacture and assembly and that exhibits a long and useful life.

In accordance with these objectives, as well as others, which will be appreciated by those possessing ordinary skill in the art of ball socket assemblies, the present disclosure is directed to providing a ball socket assembly for a motor vehicle and non-vehicle applications and to a method of construction thereof.

In accordance with one aspect, the present disclosure is directed to a ball socket assembly which advances the art and improves upon currently known ball socket assemblies for motor vehicles.

In another aspect, the present disclosure is directed to a method of construction of a ball socket assembly which advances the art and improves upon currently known methods of construction for ball socket assemblies for motor vehicles.

In accordance with these and other objects, advantages, and aspects, a ball socket assembly is provided including a housing with an inner bore extending along a central axis between a closed first end region and an open second end region. A bearing constructed of a monolithic piece of material is disposed in the inner bore of the housing. The bearing has a lower portion presenting a lower bearing surface having an unbiased first radius of curvature and an upper portion presenting an upper bearing surface having an unbiased second radius of curvature. The unbiased second radius of curvature is greater than the unbiased first radius of curvature. The lower bearing surface and the upper bearing surface surround a ball cavity. A ball stud has a shank portion extending outwardly from the housing through the open second end region and a ball portion with a spherically contoured outer surface disposed in the ball cavity. The second end region of the housing is plastically deformed radially inwardly toward the central axis and imparts a bias on the upper portion of the bearing to fix the bearing within the inner bore of the housing and to fix the ball portion in the ball cavity of the bearing. The bias on the upper portion of the bearing causes the unbiased second radius of curvature to constrict to a biased radius of curvature, wherein the biased radius of curvature is substantially equal to the unbiased first radius of curvature. Accordingly, the biased radius of curvature and the unbiased first radius of curvature form a spherical or substantially spherical bearing surface against the ball portion.

In accordance with another aspect of the disclosure, the monolithic piece of material can be provided as a fiber-reinforced material, thereby enhancing the rigidity and wear resistance of the bearing surface formed thereby.

In accordance with another aspect of the disclosure, the fiber-reinforced material can be provided as a highly wear resistant fiber-reinforced polyoxymethylene material.

In accordance with another aspect of the disclosure, the fiber-reinforced material can have a homogeneous or substantially homogenous fiber content between about 10-33 percent by volume.

In accordance with another aspect of the disclosure, the spherically contoured outer surface of the ball portion has a ball radius and the unbiased first radius of curvature is equal to or substantially equal to the ball radius, thereby providing a uniformly loaded bearing surface.

In accordance with another aspect of the disclosure, the upper portion of the bearing has a substantially constant wall thickness extending between an outer surface of the bearing and the upper bearing surface, thereby providing uniform flexural properties to the upper portion of the bearing.

In accordance with another aspect of the disclosure, the inner bore within the open second end region of the housing and the outer surface within the upper portion of the bearing have a radius of curvature equal to or substantially equal to the biased radius of curvature, thereby providing uniform loading across the aforementioned surfaces that abut one another.

In accordance with another aspect of the disclosure, the lower portion of the bearing has a substantially constant wall thickness extending between the outer surface of the bearing and the lower bearing surface.

In accordance with another aspect of the disclosure, the ball socket assembly can further include an elastic member disposed between the lower portion of the bearing and the closed first end region of the housing, wherein the elastic member can be configured to impart a bias directed toward the open second end of the housing on the bearing, thus, establishing a desired preload within the ball socket assembly.

In accordance with another aspect of the disclosure, the upper portion of the bearing can be formed having a plurality of fingers resiliently flexible radially outwardly, thereby facilitating assembly of the ball portion of the ball stud into the bearing cavity, and radially inwardly, thereby facilitating bringing the upper bearing surface into engagement with the spherically contoured outer surface for sliding relative movement therewith, relative to the central axis and relative to one another.

In accordance with another aspect of the disclosure, the plurality of fingers can be spaced circumferentially from one another by slots extending generally parallel to the central axis to facilitate relative flexing between the fingers and retention of lubrication between the spherically contoured outer surface and the upper and lower bearing surfaces.

In accordance with another aspect of the disclosure, a method of constructing a ball socket assembly is provided. The method includes providing a housing with an inner bore extending along a central axis between a closed first end region and an open second end region; providing a bearing constructed of a monolithic piece of material having a lower portion presenting a lower bearing surface having an unbiased first radius of curvature and an upper portion presenting an upper bearing surface having an unbiased second radius of curvature greater than the unbiased first radius of curvature, with the upper portion extending to an open upper end having an upper end diameter, and with the upper bearing surface and the lower bearing surface surrounding a ball cavity; providing a ball stud having a shank portion and a ball portion with a spherically contoured outer surface having a ball diameter that is greater than the upper end diameter of the bearing; snapping the ball portion through the open upper end of the bearing and into the ball cavity by causing the upper portion of the bearing to flex radially outwardly and then return resiliently radially inwardly; and plastically deforming the second end region of the housing radially inwardly toward the central axis and imparting a bias on the upper portion of the bearing to fix the bearing within the inner bore of the housing and to fix the ball portion in the ball cavity of the bearing, with the bias on the upper portion of the bearing causing the unbiased second radius of curvature to constrict to a biased radius of curvature that is substantially equal to the unbiased first radius of curvature.

In accordance with a further aspect, the method can further include providing the monolithic piece of material as a fiber-reinforced material.

In accordance with a further aspect, the method can further include providing the fiber-reinforced material as a fiber-reinforced polyoxymethylene material.

In accordance with a further aspect, the method can further include providing the fiber-reinforced material having a homogeneous or substantially homogeneous fiber content between about 10-33 percent by volume.

In accordance with a further aspect, the method can further include providing the spherically contoured outer surface of the ball portion having a ball radius being substantially equal to the unbiased first radius of curvature.

In accordance with a further aspect, the method can further include providing the upper portion of the bearing having a substantially constant wall thickness extending between an outer surface of the bearing and the upper bearing surface.

In accordance with a further aspect, the method can further include providing the lower portion of the bearing having a substantially constant wall thickness extending between the outer surface of the bearing and the lower bearing surface.

In accordance with a further aspect, the method can further include disposing an elastic member between the lower portion of the bearing and the closed first end region of the housing and imparting a bias directed toward the open second end of the housing on the bearing with the elastic member.

In accordance with a further aspect, the method can further include providing the upper portion of the bearing having a plurality of fingers that are resiliently flexible radially outwardly and radially inwardly relative to the central axis and relative to one another to facilitate assembly while preventing inadvertent damage from resulting to the bearing during assembly.

In accordance with a further aspect, the method can further include providing the plurality of fingers being spaced circumferentially from one another by slots extending generally parallel to the central axis.

In accordance with a further aspect, a bearing for a ball socket assembly is provided. The bearing includes a monolithic piece of material having a lower portion presenting a lower bearing surface having an unbiased first radius of curvature and an upper portion presenting an upper bearing surface having a non-cylindrical, unbiased second radius of curvature. The unbiased second radius of curvature is greater than the unbiased first radius of curvature, wherein the lower bearing surface and the upper bearing surface surround a ball cavity.

In accordance with a further aspect, the non-cylindrical, unbiased second radius of curvature has a spherical contour.

BRIEF DESCRIPTION OF THE DRAWINGS

These and other objects, features and advantages of the invention will become more readily appreciated when considered in connection with the following description of the presently preferred embodiments, appended claims and accompanying drawings, in which:

DESCRIPTION OF AN EXAMPLE EMBODIMENT

Figure 1:
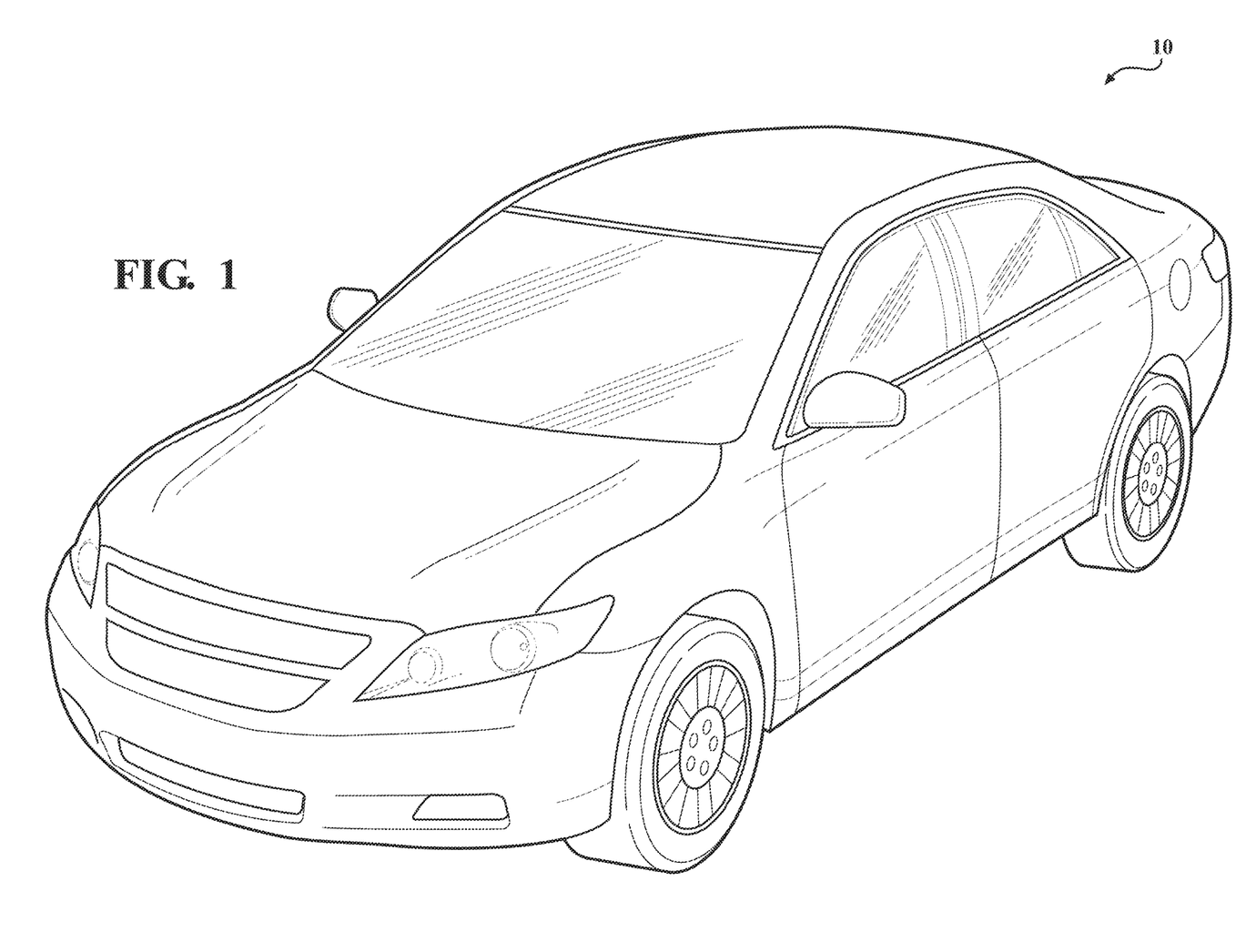
FIG. 1 is a perspective view of motor vehicle including one or more ball socket assemblies constructed in accordance with the disclosure.

Referring to the Figures, wherein like numerals indicate corresponding parts throughout the several views, unless otherwise stated, a motor vehicle 10 is shown in FIG. 1, wherein the motor vehicle 10 has at least one ball joint, also referred to as socket assembly or ball socket assembly 20 constructed in accordance with one aspect of the disclosure incorporated into a vehicle suspension and/or steering component thereof, such as in an inner tie rod end and/or other suspension applications of the motor vehicle, by way of example and without limitation. Of course, it is to be understood that the ball socket assembly 20 is well suited for use in other vehicle and non-vehicle applications. As explained in further detail hereafter, the ball socket assembly 20 and the method of construction thereof overcomes disadvantages of known ball socket assemblies and methods of construction thereof, such as those discussed above, as will become readily understood by one possessing ordinary skill in the art of ball socket assemblies.

Figure 2A:
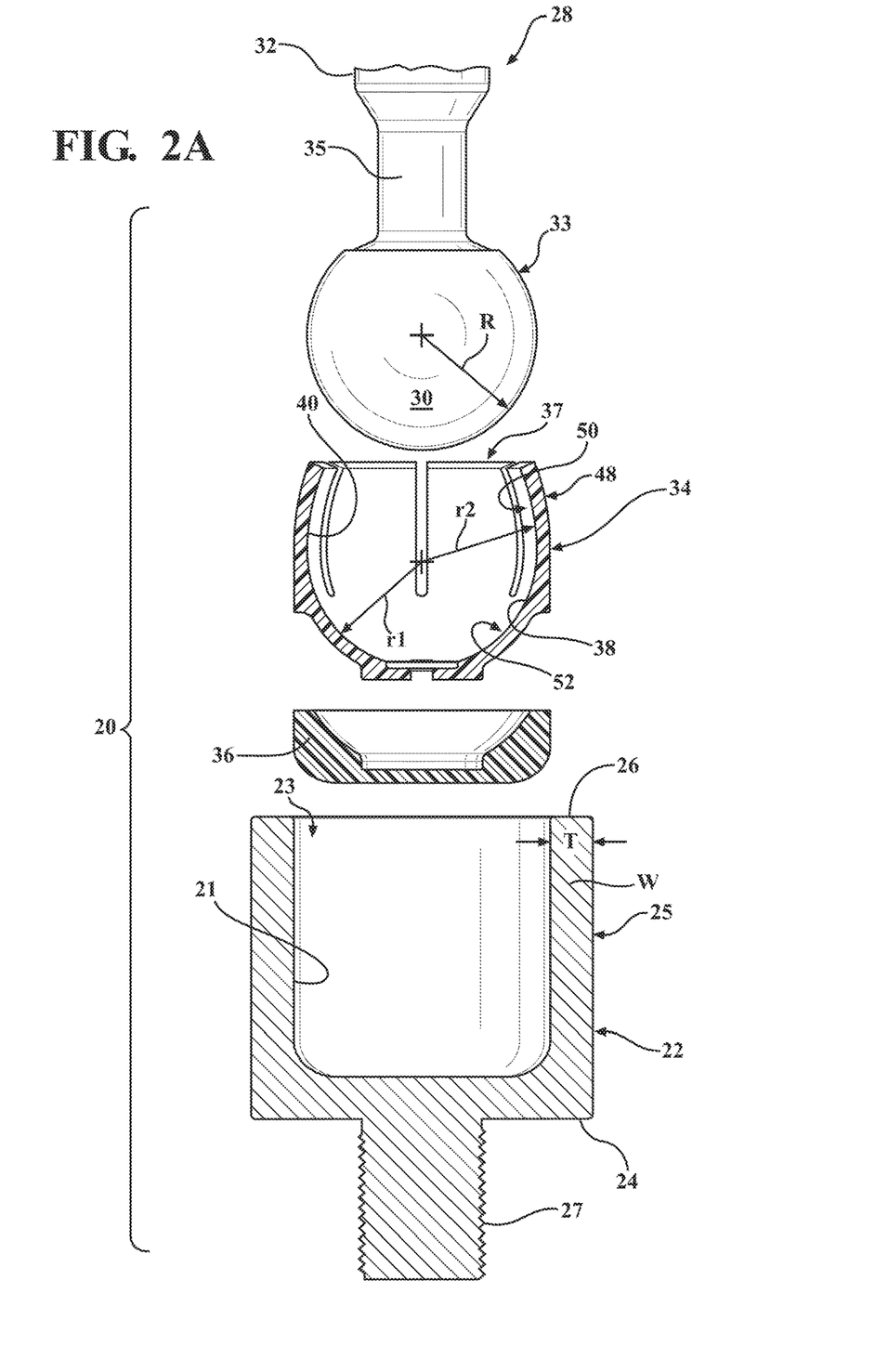
FIG. 2A is an exploded and partially cross-sectioned view of the ball socket assembly of FIG. 2.
Figure 2B:
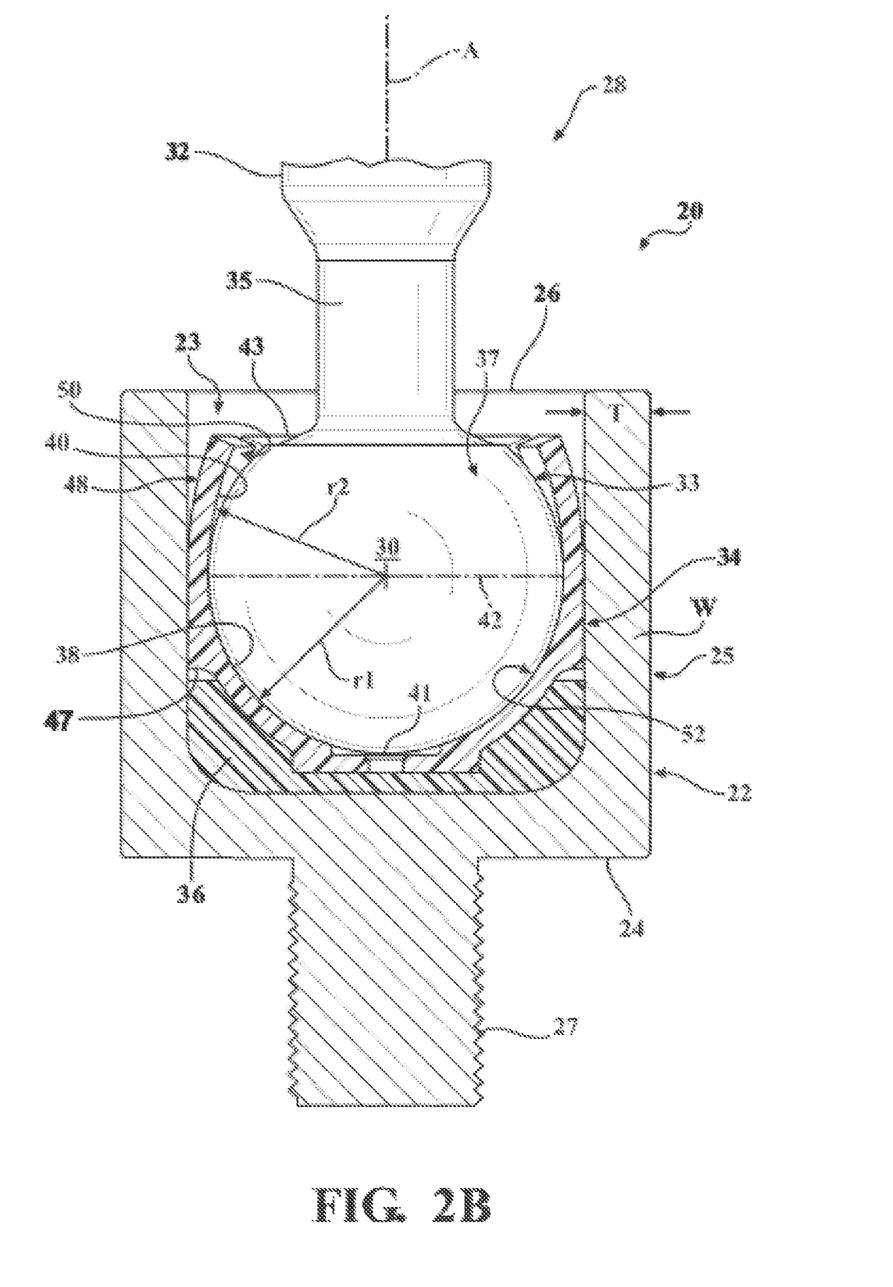
FIG. 2B is a view similar to FIG. 2 showing the ball socket assembly of FIG. 2 in a partially assembled state.
Figure 2C:
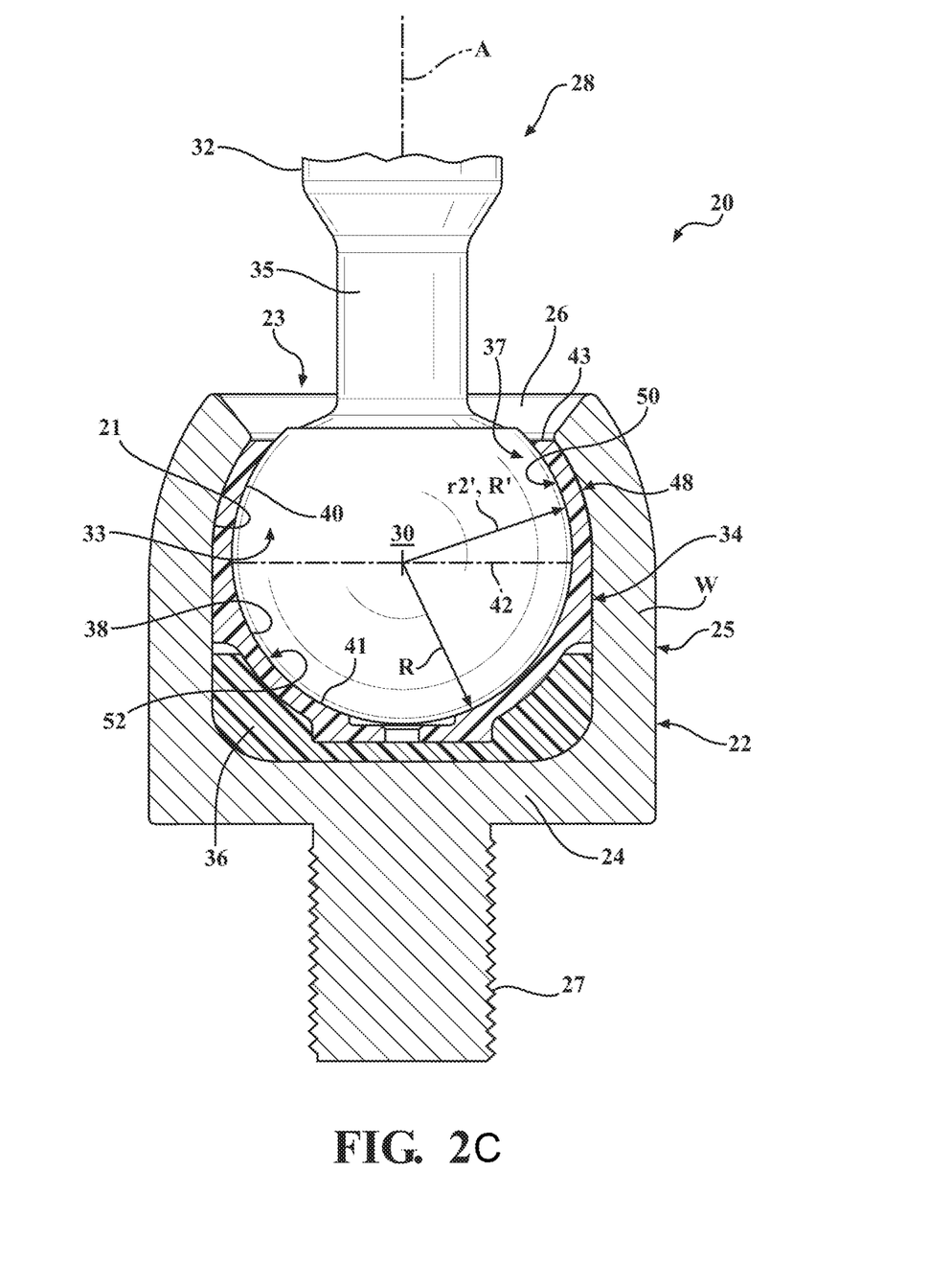
FIG. 2C is a partial cross-sectional view of an assembled ball socket assembly constructed according to one aspect of the disclosure.

Now referring to FIGS. 2A-2C, the ball socket assembly 20 includes a housing 22 having a wall W with an inner surface 21 surrounding an inner bore 23 that extends along a central axis A from a closed or substantially closed first end 24 (substantially is intended to mean there could be one or more openings, if desired, but otherwise, the end is closed) to an open second end 26. The housing 22 can be provided as a cartridge-style construction, with the wall W having an outer surface 25, such as a cylindrical or partially cylindrical outer surface, which is designed to be press-fit into a similarly shaped opening of another component, such as a control arm (not shown), by way of example and without limitation, or the housing 22 can include a fixation member, shown as a threaded stud 27 extending along the central axis A from the closed first end 24, wherein the threaded stud 27 can be configured for attachment to a steering member or otherwise. The wall W extends from the closed first end 24 to the open second end 26, wherein the wall W can be formed having a generally constant wall thickness (T). The housing 22 is preferably made as a single piece of metal, such as steel or an alloy steel, and may be formed through any suitable process or combination of processes, including casting, forging, and machining.

The ball socket assembly 20 also includes a single piece ball stud 28 that has a ball portion 30 and a shank portion 32 which extends from the ball portion 30. The ball portion 30 is disposed in the inner bore 23 of the housing 22, and the shank portion 32 extends out of the inner bore 23 through the open second end 26 of the housing 22. The ball portion 30 has a spherically contoured outer surface 33, with exception to a region that attaches to the shank portion 32, thereby rendering the outer surface 33 slightly less than spherical and more than semi-spherical. The spherically contoured outer surface 33 is formed having a ball radius (R). Adjacent and extending from the ball portion 30, the shank portion 32, by way of example and without limitation, has a neck 35 with a reduced diameter as compared to the remainder of the shank portion 32 extending from the neck 35 away from the ball portion 30, such that the neck 35 is between the enlarged diameter region of the shank portion 32 and the ball portion 30. The ball stud 28 is preferably made as a monolithic piece of metal, such as steel or an alloy steel, and may be formed through any suitable process or combination of processes, e.g., casting, forging, machining, etc.

A bearing 34 is disposed in the inner bore 23 between the housing 22 and the ball portion 30 of the ball stud 28 to provide a low friction surface against which the ball stud 28 can rotate and articulate. The bearing 34 has a curved, concave bearing surface which surrounds a ball cavity 37, wherein the ball portion 30 of the ball stud 28 is sized for close sliding receipt in the ball cavity 37. The curved bearing surface of the bearing 34 has a spherically contoured lower bearing surface, also referred to as lower bearing surface portion, or simply lower portion 38, and a spherically contoured upper bearing surface, also referred to as upper bearing surface portion, or simply upper portion 40. The lower portion 38 has an unbiased first radius of curvature (r1) extending from a closed lower end 41 of the bearing 34 to an equator 42 of the bearing 34 and the ball portion 30, when the ball portion 30 is assembled within the ball cavity 37, wherein the equator 42 extends transversely to central axis A, and the upper bearing portion 40 has an unbiased second radius of curvature (r2) extending generally from an open upper end 43 of the bearing 34 generally to the equator 42, wherein, prior to assembling and fixing the bearing 34 in the inner bore 23 of the housing 22, the unbiased second radius of curvature r2 is greater than the unbiased first radius of curvature r1. Accordingly, in an as-molded condition and prior to assembly, the lower portion 38 of the bearing surface is curved with the first radius of curvature r1, wherein the lower portion 38 has the same or generally the same radius of curvature as the radius of curvature R of the outer surface 33 of the ball portion 30. Accordingly, r1 is equal to or substantially equal to R. However, the upper portion 40 of the bearing surface is curved with the second radius of curvature r2 that is greater than the first radius of curvature r1. Thus, an imaginary diameter having the curvature r2 of the open upper end 43 of the bearing 34 is greater than it would be if the upper portion 40 was also initially constructed with the first radius of curvature r1.

The bearing 34 is constructed as a single, monolithic piece of material, such as a highly wear resistant fiber-reinforced material, such as polyoxymethylene (also known as acetal), by way of example and without limitation. The fibers within the fiber-reinforced material are preferably made of glass or carbon, and are provided having a homogeneous or substantially homogeneous content between about 10-33 percent by volume. This fiber-reinforced material has been found to provide the bearing 34 with exceptional wear resistance throughout the full expected operating life of the ball socket assembly 20. The bearing 34 is preferably made through an injection molding operation, though other processes are contemplated herein, such as other types of molding, extrusion and machining processes, for example.

During assembly, an elastic member, also referred to as preload member 36, which is constructed of a resilient compressible material, is disposed in the inner bore of the housing 22 between the closed first end 24 of the housing 22 and the lower end 41 of the bearing 34 for imparting an axially directed biasing force along central axis A on the bearing 34 in a direction towards the open second end 26 of the housing 22. As such, the preload member 36 preloads the bearing surface of the bearing 34 against the spherically contoured outer surface 33 of the ball portion 30 of the ball stud 28 to provide the ball socket assembly 20 with a desirable initial torque to facilitate the desired articulation of the ball stud 28 and the desired rotational resistance of the ball portion 30 to obtain a smooth feel and ride of the suspension components of the motor vehicle 10. The preload member 36 is made of a resiliently compressible material and may be shaped through any suitable process including, for example, injection molding.

After assembly of the ball socket assembly 20 is completed, both of the lower and upper portions 38, 40 of the curved bearing surface have the same or approximately (meaning substantially, wherein one or both radii of curvature may be slightly different than the radius R, but not sufficiently so as to affect the desired performance of the bearing 34) the same radius of curvature R' corresponding to the ball radius R of the ball portion 30 of the ball stud 28. Accordingly, the unbiased second radius of curvature r2 is biased to a reduced radius of curvature r2', wherein r2' is equal to or substantially equal to r1. As such, as shown in FIGS. 2 and 3, when the ball stud 28 is oriented along the central axis A and the bearing 34, with the ball portion 30 therein are fully assembled and fixed within the housing 22, the curved bearing surface formed by the lower and upper portions 38, 40 is in mating surface-to-surface contact with both of the upper and lower hemispheres of the ball portion 30 extending along opposite sides of the equator 42 of ball portion 30.

Figure 3:
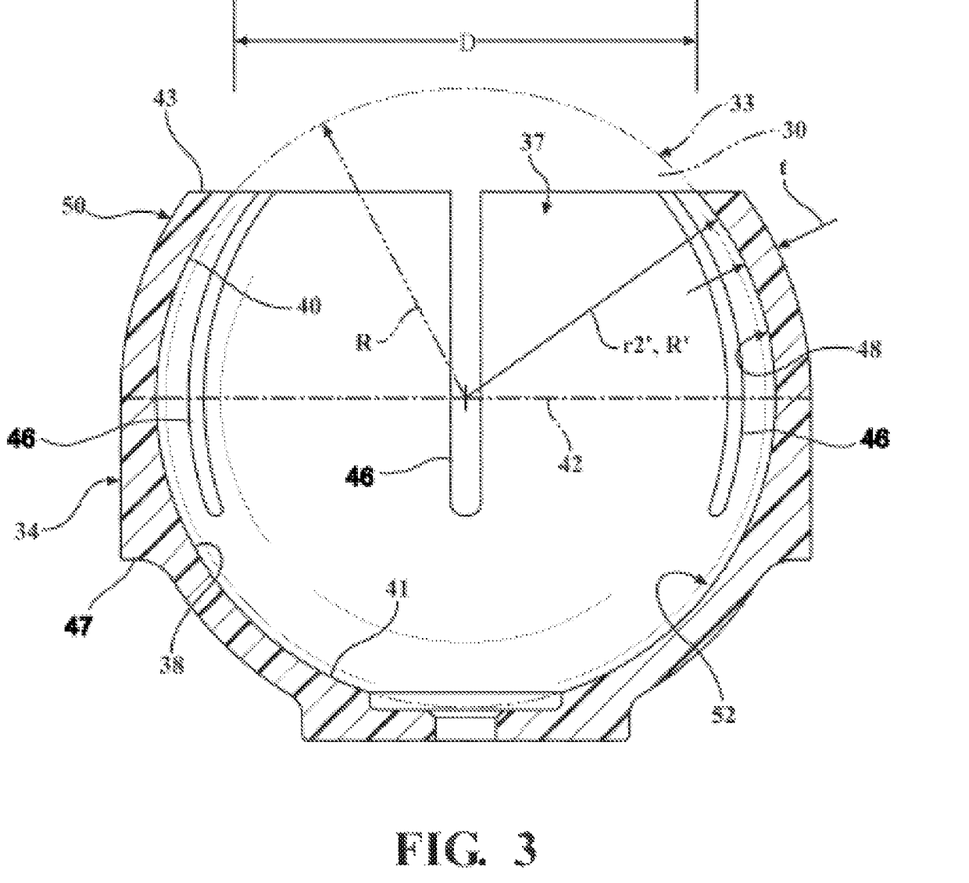
FIG. 3 is an enlarged cross-sectional view of a bearing from the ball socket assembly of FIG. 2 shown in an assembled state about a ball portion of a ball stud shown in phantom.
Figure 4:
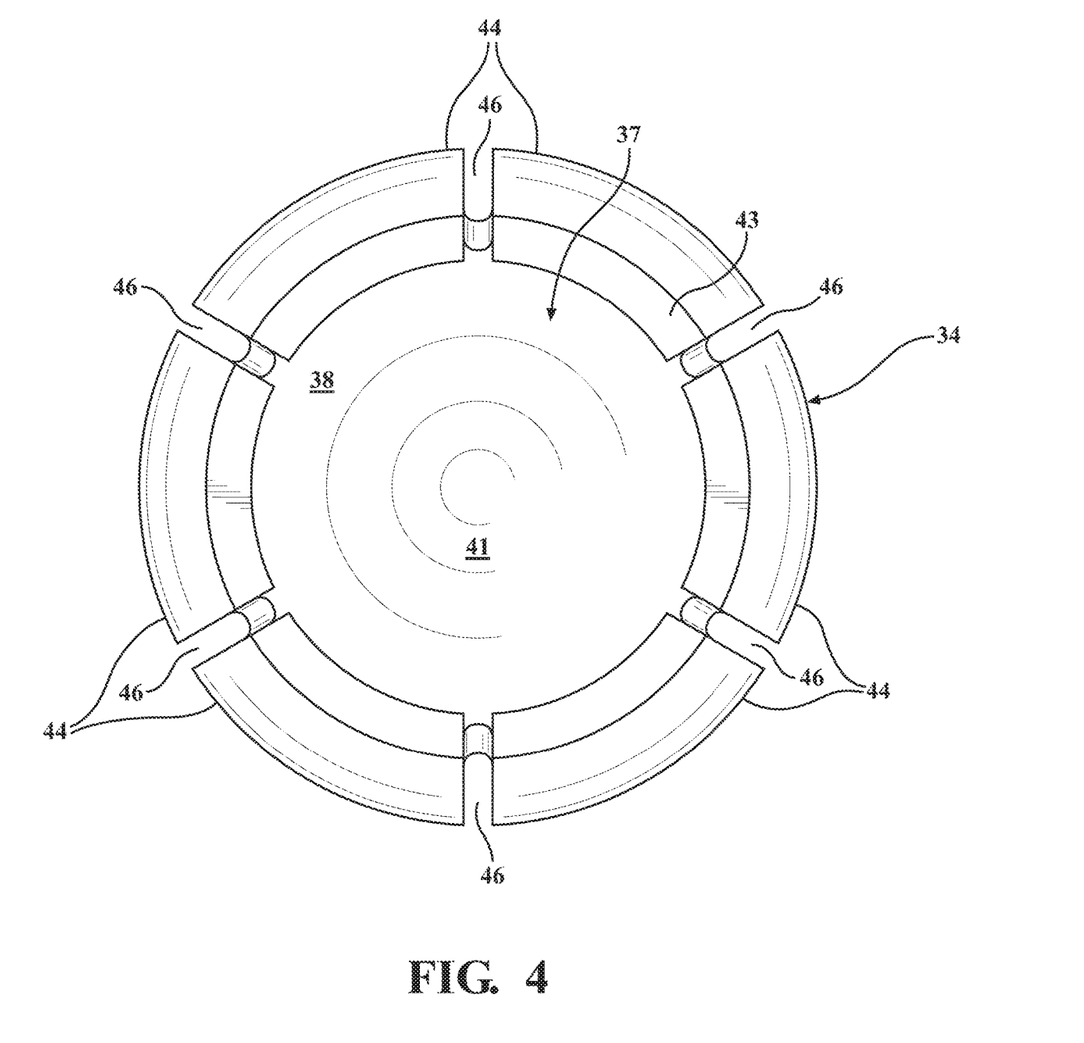
FIG. 4 is a top view of the bearing of FIG. 3.

Referring now to FIGS. 3 and 4, the upper portion 40 of the bearing 34 has a plurality of fingers 44 that are circumferentially spaced apart from one another by a plurality of slots 46 which extend axially downwardly from the open upper end 43 of the bearing 34. The slots 46 allow the fingers 44 to resiliently flex radially outwardly away from the central axis A as the ball portion 30 of the ball stud 28 is inserted into the ball cavity 37 through the open upper end 43 of the bearing 34, whereupon the fingers 44 resiliently return radially inwardly upon fully inserting the ball portion 30 into the ball cavity 37, and further allow the fingers to be biased radially inwardly into mating contact with the outer surface 33 of the ball portion 30 upon completing assembly of the ball socket assembly 20. The bearing 34 includes an outer shoulder 47 that is provided at the transition between the upper portion 40 and lower portion 38. In the exemplary embodiment, the slots 46 extend from the open upper end 43 of the bearing 34 to or approximately to the equator 42, and shown in FIGS. 2A and 3 as extending slightly beyond the equator 42 that extends transversely to the central axis A approximately midway between the neck 35 and an apex of the ball portion 30 diametrically opposite the neck 35. The slots 46 do not extend below the shoulder 47. The lower portion 38 is free of slots.

During assembly of the ball socket assembly 20, the ball portion 30 of the ball stud 28 is preferably inserted into the ball cavity 37 of the bearing 34 before the bearing 34 is inserted into the inner bore of the housing 22; however, it is contemplated that the bearing 34 could be first disposed in the inner bore 23 of the housing 22, and then, the ball portion 30 could be snapped into the ball cavity 37. Specifically, the bearing 34 is "snapped over" the upper end 43 of the ball portion 30 by urging the ball portion 30 through the open upper end 43 of the bearing 34. Since the diameter of the open upper end 43 is less than the diameter of the ball portion 30 while the fingers 44 are in as formed, non-biased state, the fingers 44 of the bearing 34 must flex radially outwardly to allow the ball portion 30 to pass into the ball cavity 37. However, the magnitude of this flexing is less than it would be if the upper portion 40 of the bearing 34 were initially constructed to have the first radius of curvature r1. Thus, the force required to snap the ball portion 30 into the ball cavity 37 is greatly reduced as compared to if the upper portion 40 were to have the same radius of curvature r1 as the lower portion 38, and thus, the stress placed on the fingers 44 and on the bearing 34 in general during assembly is such that damage to the bearing 34, such as stress cracks, is prevented. The reduced stress placed on the fingers 44 during assembly allows the percent content of the fibers (e.g. glass or carbon fibers) to be provided between about 10-33% by volume, thereby providing enhanced rigidity, optimal wear resistance and increased longevity of life in use, while avoiding performance degrading damage to the fingers 44 (i.e. cracking) during assembly. At this point in the assembly process, because the upper portion 40, formed at least in part by the fingers 44, has the larger second radius of curvature r2, the upper portion 40 of the curved bearing surface is spaced out of contact radially outwardly from the ball portion 30 of the ball stud 28, as shown in FIG. 2B, but not to the extent as if the upper portion 40 were cylindrical.

Next, firstly the preload member 36 and then the bearing 34, with the ball portion 30 disposed in the ball cavity 37, are inserted into the generally cylindrical inner bore 23 of the housing 22 through the generally cylindrical open second end 26 of the housing 22. Then, with the preload member 36 resting against the closed first end 24 of the housing 22, and the closed lower end 41 of the bearing 34 resting against the preload member 36, the open second end 26 of the housing 22 is then plastically deformed (such as in a crimping, rolling or swaging process, by way of example and without limitation) in a radially inward direction to capture the preload member 36, bearing 34, and ball portion 30 within the inner bore 23. During the deformation operation, the housing 20 also closes and biases the fingers 44 of the upper portion 40 of the bearing 34 radially inwardly around the upper hemisphere of the ball portion 30 of the ball stud 28 to eliminate or substantially eliminate (substantially is intended to mean that a slight gap may remain, but any remaining gap is negligible to the extent that it does not adversely affect the desired performance of the ball socket assembly 20) the aforementioned gap between the curved bearing surface formed by the lower and upper portions 38, 40 and the outer surface 33 of the ball portion 30. Since the upper portion 40 of the bearing 34 is initially curved and spherically contoured (as opposed to being cylindrical in shape), closing the upper portion 40 around the outer surface 33 of the ball portion 30 of the ball stud 28 does not impart sufficient stress into the fiber reinforced bearing material to crack or otherwise break the bearing 34, such as would more likely occur if the upper portion 40 were cylindrical and not formed having the radius r2.

Deforming the housing 22 also urges the bearing 34 axially downwardly along the central axis A against the preload member 36 to axially compress and bias the preload member 36. Due to the compressible, resilient nature of the preload member 36, as the bearing 34 and ball portion 30 wear during the operating life of the ball socket assembly 20, the preload member 36 can maintain a suitable reaction bias on the bearing 34 to maintain the desired surface-to-surface contact between the curved bearing surface of the bearing 34 and the outer surface 33 of the ball portion 30 of the ball stud 28.

Figure 5:
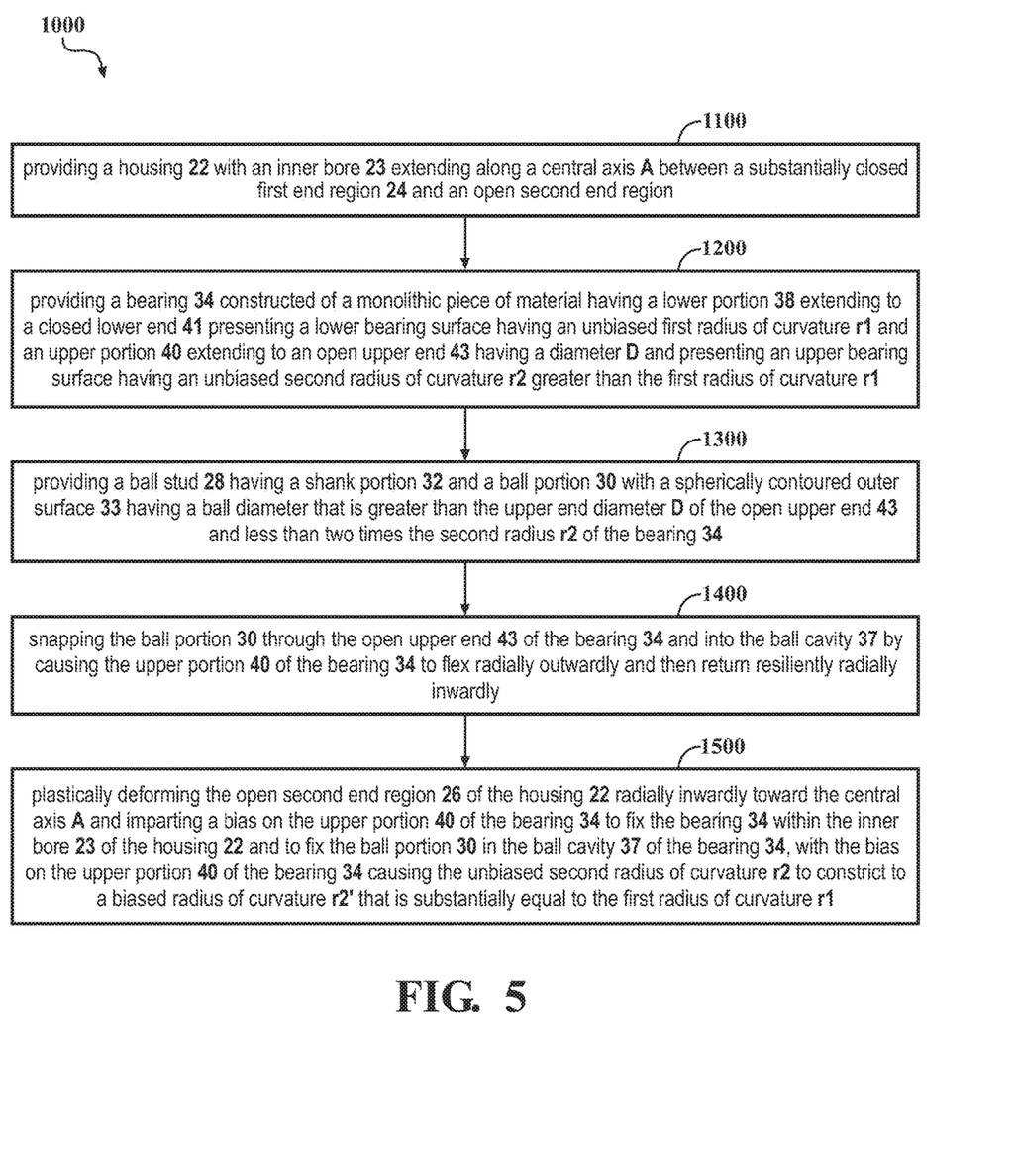
FIG. 5 is a flow diagram illustrating a method of constructing a ball socket assembly in accordance with another aspect of the disclosure.

In accordance with a further aspect of the disclosure, as shown diagrammatically in FIG. 5, a method of constructing the ball socket assembly 20 is provided, as shown generally at 1000. The method 1000 generally includes a step 1100 of providing a housing 22 with an inner bore 23 extending along a central axis A between a closed first end region 24 and an open second end region 26. Further, a step 1200 of providing a bearing 34 constructed of a monolithic piece of material having a lower portion 38 presenting a lower bearing surface having an unbiased first radius of curvature r1 and an upper portion 40 presenting an upper bearing surface having an unbiased second radius of curvature r2 greater than the unbiased first radius of curvature r1, with the upper portion 40 extending to an open upper end 43 having an upper end diameter D (FIG. 3), and with the upper bearing surface and the lower bearing surface surrounding a ball cavity 37. Further, a step 1300 of providing a ball stud 28 having a shank portion 32 and a ball portion 30 with a spherically contoured outer surface 33 having a ball diameter two times R, 2(R), that is greater than the upper end diameter D of the open upper end 43 and less than two times the second radius r2 of the bearing 34. Further, a step 1400 of snapping the ball portion 30 through the open upper end 43 of the bearing 34 and into the ball cavity 37 by causing the upper portion 40 of the bearing 34 to flex radially outwardly and then return resiliently radially inwardly. Further yet, a step 1500 of plastically deforming the open second end region 26 of the housing 22 radially inwardly toward the central axis A and imparting a bias on the upper portion 40 of the bearing 34 to fix the bearing 34 within the inner bore 23 of the housing 22 and to fix the ball portion 30 in the ball cavity 37 of the bearing 34, with the bias on the upper portion 40 of the bearing 34 causing the unbiased second radius of curvature r2 to constrict to a biased radius of curvature r2' that is substantially equal to the unbiased first radius of curvature r1.

In accordance with a further aspect, the method can further include providing the monolithic piece of material of the bearing 34 as a fiber-reinforced material.

In accordance with a further aspect, the method can further include providing the fiber-reinforced material of the bearing 34 as a fiber-reinforced polyoxymethylene material.

In accordance with a further aspect, the method can further include providing the fiber-reinforced material having a homogeneous or substantially homogeneous fiber content between about 10-33 percent by volume.

In accordance with a further aspect, the method can further include providing the spherically contoured outer surface 33 of the ball portion 30 having a ball radius R being substantially equal to the unbiased first radius of curvature r1.

In accordance with a further aspect, the method can further include providing the upper portion 40 of the bearing having a substantially constant wall thickness (t) extending between an outer surface 48 of the bearing and an upper inner bearing surface 50 formed by the upper portion 40.

In accordance with a further aspect, the method can further include providing the lower portion 38 of the bearing 34 having a substantially constant wall thickness (t) extending between the outer surface 50 of the bearing 34 and a lower inner bearing surface 52 formed by the lower portion 38.

In accordance with a further aspect, the method can further include disposing an elastic member 36 between the lower portion 38 of the bearing 34 and the closed first end region 24 of the housing 22 and imparting a bias directed toward the open second end 26 of the housing 22 on the bearing 34 with the elastic member 36.

In accordance with a further aspect, the method can further include providing the upper portion 40 of the bearing 34 having a plurality of fingers 44 that are resiliently flexible radially outwardly and radially inwardly relative to the central axis A and relative to one another to facilitate assembly while preventing inadvertent damage from resulting to the bearing 34 during assembly.

In accordance with a further aspect, the method can further include providing the plurality of fingers 44 being spaced circumferentially from one another by slots 46 extending generally parallel to the central axis A.

Obviously, many modifications and variations of the present invention are possible in light of the above teachings. It is to be understood that although the ball socket assembly 20 is depicted in a suspension/steering application of the motor vehicle 10, other applications within the motor vehicle 10 are contemplated herein, as well as other non-vehicular applications. Further yet, it is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A ball socket assembly, comprising:
a housing with an inner bore extending along a central axis between a closed first end region and an open second end region;
a bearing constructed entirely of a monolithic piece of fiber-reinforced material disposed in said inner bore of said housing, said bearing having a lower portion presenting a curved lower bearing surface having an unbiased first radius of curvature and an upper portion presenting a curved upper bearing surface having an unbiased second radius of curvature, said unbiased second radius of curvature being greater than said unbiased first radius of curvature, said lower bearing surface and said upper bearing surface surrounding a ball cavity made of the fiber-reinforced material, said bearing including an outer shoulder disposed between said upper and lower portions;

a ball stud having a shank portion extending outwardly from said housing through said open second end region and a ball portion with a spherically contoured outer surface disposed in said ball cavity;

said second end region of said housing being plastically deformed radially inwardly toward said central axis and imparting a bias on said upper portion of said bearing to fix said bearing within said inner bore of said housing and to fix said ball portion in said ball cavity of said bearing, said bias on said upper portion of said bearing causing said unbiased second radius of curvature to constrict to a biased radius of curvature, wherein said biased radius of curvature is substantially equal to said unbiased first radius of curvature; and further including an elastic member disposed between said lower portion of said bearing and said closed first end region of said housing, said elastic member being cup-shaped and extending fully across and covering the closed first end region of the housing and imparting a bias directed toward said open second end region of said housing on said bearing and said upper portion including a plurality of slots extending from an open upper end of said bearing and not extending below said shoulder and wherein the lower portion is free of slots.

2. The ball socket assembly of claim 1, wherein said fiber-reinforced material is a fiber-reinforced polyoxymethylene material.

3. The ball socket assembly of claim 1, wherein said spherically contoured outer surface of said ball portion has a ball radius and said unbiased first radius of curvature is substantially equal to said ball radius.

4. The ball socket assembly of claim 1, wherein said upper portion of said bearing has a substantially constant wall thickness extending between an outer surface of said bearing and said upper bearing surface.

5. The ball socket assembly of claim 4, wherein said inner bore within said open second end region of said housing and said outer surface within said upper portion of said bearing have a radius of curvature substantially equal to said biased radius of curvature.

6. The ball socket assembly of claim 4, wherein said lower portion of said bearing has a substantially constant wall thickness extending between said outer surface of said bearing and said lower bearing surface.

7. The ball socket assembly of claim 1, wherein said upper portion of said bearing has a plurality of fingers resiliently flexible radially outwardly and radially inwardly relative to said central axis and relative to one another.

8. The ball socket assembly of claim 1, wherein said fiber-reinforced material has a fiber content between about 10-33 percent by volume.

9. A method of constructing a ball socket assembly, comprising:

providing a housing with an inner bore extending along a central axis between a closed first end region and an open second end region;

providing a bearing constructed entirely of a monolithic piece of fiber-reinforced material having a lower portion presenting a curved lower bearing surface having an unbiased first radius of curvature and an upper portion presenting a curved upper bearing surface having an unbiased second radius of curvature greater than the unbiased first radius of curvature, with the upper portion extending to an open upper end having an upper end diameter, and with the upper bearing surface and the lower bearing surface surrounding a ball cavity that is made of the fiber-reinforced material;

providing the bearing with an outer shoulder and providing the upper portion with a plurality of slots that extend from the open upper end of the bearing to define a plurality of flexible fingers of the upper portion above the outer shoulder;

providing a ball stud having a shank portion and a ball portion with a spherically contoured outer surface having a ball diameter that is greater than the upper end diameter of the bearing;

snapping the ball portion through the open upper end of the bearing and into the ball cavity by causing the flexible fingers of the upper portion of the bearing to flex radially outwardly and then return resiliently radially inwardly;

plastically deforming the second end region of the housing radially inwardly toward the central axis and imparting a bias on the upper portion of the bearing to fix the bearing within the inner bore of the housing and to fix the ball portion in the ball cavity of the bearing, with the bias on the upper portion of the bearing causing the unbiased second radius of curvature to constrict to a biased radius of curvature that is substantially equal to the unbiased first radius of curvature;

further including disposing an elastic member between the lower portion of the bearing and the closed first region of the housing including at the central axis and imparting a bias directed toward the open second end region of the housing on the bearing with the elastic member, and wherein the lower portion is free of slots.

10. The method of claim 9, further including providing the fiber-reinforced material as a fiber-reinforced polyoxymethylene material.

11. The method of claim 9, further including providing the spherically contoured outer surface of the ball portion having a ball radius being substantially equal to the unbiased first radius of curvature.

12. The method of claim 9, further including providing the upper portion of the bearing having a substantially constant wall thickness extending between an outer surface of the bearing and the upper bearing surface.

13. The method of claim 12, further including providing the lower portion of the bearing having a substantially constant wall thickness extending between the outer surface of the bearing and the lower bearing surface.

14. The method of claim 9, further including providing the fiber-reinforced material having a fiber content between about 10-33 percent by volume.

\* \* \* \* \*